United States Patent Office

2,968,642
Patented Jan. 17, 1961

2,968,642

STABILIZERS FOR POLYMERIC COMPOSITIONS

William M. Le Suer, Cleveland, Ohio, assignor to The Lubrizol Corporation, Wickliffe, Ohio, a corporation of Ohio No Drawing. Filed Jan. 17, 1957, Ser. No. 634,628

9 Claims. (Cl. 260—45.75)

This invention relates to novel plastic compositions which have an enhanced stability with respect to the effects of heat and light. In a more particular sense it relates to compositions containing relatively large amounts of barium which are capable of imparting to plastic compositions the above-mentioned stability.

The particular plastic compositions which are benefited most by the stabilizing action of the compositions of this invention are those which contain chlorine attached to an aliphatic carbon atom. Such plastic substances are represented by polymers of vinyl chloride. Such polymers have a tendency to decompose, especially at elevated temperatures, with the evolution of hydrogen chloride. Such decomposition is undesirable for a variety of reasons, but particularly because it is associated with a darkening of the color of the plastic material.

The use of minor amounts of additives for their stabilizing action with respect to such decompositions has been known for some time and these additives are for the most part presumed to act in such a manner as to inhibit the evolution of hydrogen chloride. This presumption is based upon the fact that many of the effective additives are basic.

It is a principal object of the present invention to provide novel compositions which may be useful as stabilizers of chlorine-containing polymeric materials.

It is also an object of the present invention to provide plastic compositions having enhanced stability toward heat and light.

These and other objects are accomplished by the process of preparing oil-soluble compositions containing large amounts of barium which comprises preparing a mixture of (a) an alkylated monohydroxy aromatic compound, (b) an oil-soluble, metal-free non-tautomeric organic polar compound selected from the class consisting of neutral and basic compounds present in an amount greater than that of (a) on a weight basis, and (c) at least two equivalents of a basic barium compound per equivalent of (a) and heating said mixture to drive off substantially all free water which may be present and then treating said water-free mixture with an acidic gas having an ionization constant greater than that of (a) until the titratable basicity of the mixture has been substantially reduced.

The alkylated hydroxy aromatic compounds contemplated for use in the above process are particularly those which yield oil-soluble barium phenates and in which an alkyl group contains at least about three carbon atoms. Such alkyl groups as isopropyl, tertitary-butyl, 2-methylamyl-4, isoheptyl, diisobutyl, n-decyl, tetrapropyl, octadecyl, polyisobutyl (derived from polyisobutylene fractions of various molecular weights), etc. are illustrative of the groups which may be used. In lieu of alkyl groups, cycloalkyl groups such as, e.g., cyclohexyl, methylcyclohexyl, etc. may be used. The hydroxy aromatic compound may contain other groups in addition to the alkyl or cycloalkyl groups. Thus, halogen, nitro, alkoxy, etc. groups may be present. Likewise the aldehyde condensation products of the above-described alkylated hydroxy aromatic compounds are contemplated.

The basic inorganic barium compounds include principally the oxide and hydroxide and in some instances the sulfide.

The process mixture generally contains some water which is added to aid in fluidizing the inorganic metal compound. It is necessary that this water be removed from the mixture before the process can be effected. Removal of the water is a simple matter, involving only its distillation from the process mixture. The temperature at which the mass is treated with an acidic gas usually is above 100° C., and in the course of heating the process mixture to this temperature the last traces of free water are substantially eliminated.

The oil-soluble, metal-free, non-tautomeric neutral and basic organic polar compounds are characterized by having both an oil-solubilizing substituent such as a long hydrocarbon chain, and also by having a non-acidic polar group such as an ester, amide, amine, hydroxy, sulfoxy, ether, sulfide, etc. group. Some specific examples of such polar compounds include the following: glyceryl oleate or stearate, octadecenyl or oleyl alcohol, tridecyl alcohol, N-octadecyl propylene diamine, sperm oil, etc. The most suitable organic polar compounds have been found to be those which contain a total of at least 12 aliphatic carbon atoms in the molecule. For an appropriate discussion of the word "tautomeric," reference may be had to "Advanced Organic Chemistry," by G. W. Wheland, John Wiley & Sons, New York 1949, chapter 14.

The use of the above-described polar compounds in the process of this invention appears to have a solubilizing effect with respect to the basic inorganic barium compound which is incorporated into the ultimate product. This is an unexpected function for such neutral and basic non-tautomeric materials and it is not clear how such a function can be explained in terms of the molecular structure of a non-acidic compound. The previous use of such compounds in fluidizing and imparting filterability to oleaginous compositions is well-known, but so far as I am aware, it has not been known that neutral or basic non-tautomeric metal-free polar compounds are capable of sustaining the solubility of otherwise insoluble metal compositions in oil which do not also contain any of the well-known dispersants, such as sulfonates or carboxylates.

It is quite probable that the neutral or basic non-tautomeric polar compound has certain hitherto unknown dispersant qualities which enable it to preserve the basic inorganic barium compound in a colloidal suspension, although as indicated previously, it is not known just how it really does operate.

By the term "acidic gas" is meant one which upon reaction with water would produce an acid. Thus, such gases as sulfur dioxide, sulfur trioxide, carbon dioxide, carbon disulfide, hydrogen sulfide, nitric oxide, etc. are exemplary of the acidic gases which are useful in the process of this invention. Of these carbon dioxide, because of its low cost and particular utility in the process, is preferred.

The treatment with an acidic gas is conducted in such a manner as to reduce substantially the titratable basicity of the mass. There are essentially two materials in the mass prior to carbonation which are susceptible to reaction with the acidic gas: the free barium base (that which is in excess of the stoichiometric quantity required to form the normal phenate) and the barium phenate. It is possible that each of these materials reacts with the acidic gas (e.g., is carbonated) simultaneously, but it is more likely that the excess barium base reacts first and when this reaction is complete the barium phenate reacts. It is understood of course that reaction of the barium phenate results in the liberation of the phenol from its metal salt.

The amount of acidic gas which is used in the process depends in some respects upon the desired basicity of the particular product in question. Thus, in the case of a highly basic product only a small amount of acidic gas will be required. Ordinarily, however, a less basic product is desired and in such instances a larger amount of acidic gas is used. A particularly preferred product is one in which the basicity has been substantially neutralized, i.e., one in which the neutralization number is less than about 10. The preparation of such a neutral product entails the use of a rather large amount of acidic gas, i.e., more than 25 percent by weight of the amount of the metal phenate which is being so treated. Generally, more than the theoretical quantity of acidic gas is required to achieve any desired degree of basicity in a particular product.

In some instances a more basic product may be acceptable and the preparation of such products will require the use of only 10–25 percent by weight of acidic gas, based on the barium phenate being treated.

The treatment of the above-described process mixture with acidic gas appears to have two quite beneficial effects. It has a clarifying effect on both the process mixture and on the ultimate product, and it allows the incorporation of significantly more barium into the oil-soluble product. It is apparent that this latter effect can be realized only when there is present in the reaction mixture an appreciable quantity of oil-insoluble barium base. Thus, it is important for the incorporation of the maximum amount of barium that the process mixture not be separated (as, e.g., by filtration) from oil-insoluble barium base before carbonation.

The following examples illustrate some of the details of the process of this invention. The term "metal ratio" employed in this specification is the ratio of total barium in the oil-soluble composition to total equivalents of alkylated hydroxy-aromatic compound present. It is thus a convenient measure of the amount of excess barium present in the composition, i.e., that amount of barium in excess of the stoichiometric amount required to satisfy the organic salt-forming anions present.

*Example 1*

A sulfoxide was prepared treating polyisobutylene of 750 average molecular weight with 47.5 percent of its weight of $SOCl_2$ for 4.5 hours at 200–220° C. A mixture of 787 grams (1.0 equivalent) of this sulfoxide, 124 grams (0.6 equivalent) of diisobutyl phenol, 550 grams of mineral oil and 200 grams of water was warmed to 70° C. and then treated with 306 grams (4.0 equivalents) of barium oxide. This mixture was heated at reflux temperature for one hour and then treated at 150° C. with carbon dioxide until the mixture was substantially neutral. The resulting mixture was filtered through Hyflo to yield a clear oil-soluble liquid having the following analyses:

Percent sulfate ash _____ 22.8
Neut. No _____ 5.8 (basic)
Metal ratio _____ 5.8

*Example 2*

To a mixture of 268 grams (1.0 equivalent) of oleyl alcohol, 675 grams of mineral oil, 124 grams (0.6 equivalent) of diisobutyl phenol, and 146 grams of water, at 70° C. there was added 308 grams (4.0 equivalents) of barium oxide. This mixture was heated at reflux temperature for one hour, then at 150° C. while a stream of carbon dioxide was bubbled through the mixture until it was substantially neutral. The thus acidified mixture was filtered and the clear brown oil-soluble filtrate found to have the following analyses:

Percent sulfate ash _____ 29.8
Neut. No _____ 2.6 (basic)
Metal ratio _____ 6.0

*Example 3*

A mixture of 268 grams (1.0 equivalent) of oleyl alcohol, 90 grams (0.6 equivalent) of tertiary-butyl phenol, 1114 grams of mineral oil and 190 grams of water was warmed to 70° C., treated with 306 grams (4.0 equivalents) of barium oxide and then heated to 150° C. A stream of carbon dioxide was bubbled into the mixture at this latter temperature until the mixture was substantially neutral. Filtration through Hyflo yielded a clear brown oil-soluble filtrate with the following analyses:

Percent sulfate ash _____ 23.4
Neut. No _____ 6.7 (basic)
Metal ratio _____ 6.2

*Example 4*

A mixture of 268 grams (1.0 equivalent) of oleyl alcohol, 124 grams (0.6 equivalent) of heptyl phenol, 1034 grams of mineral oil, and 190 grams of water there was added at 70° C. 306 grams (4.0 equivalents) of barium oxide. This mixture was heated at reflux temperature for an hour and then treated with sulfur dioxide at 150° C. until the mixture was acidic. The mixture was filtered through Hyflo to yield a product having the following analyses:

Percent sulfate ash _____ 20.9
Neut. No _____ 3.0 (acidic)
Metal ratio _____ 5.3

*Example 5*

To a mixture of 423 grams (1.0 equivalent) of sperm oil, 124 grams (0.6 equivalent) of heptyl phenol, 500 grams of mineral oil and 150 grams of water there was added at 70° C. 308 grams (4.0 equivalents) of barium oxide. This mixture was heated at reflux temperature for one hour, then dried by heating to 150° C. and carbonated by treatment with carbon dioxide at this temperature until it was slightly acidic. Filtration yielded a clear light brown, non-viscous liquid showing the following analyses:

Percent sulfate ash _____ 32.0
Neut. No _____ 0.5 (basic)
Metal ratio _____ 6.5

*Example 6*

To a mixture of 500 grams (1.0 equivalent) of polyisobutylphenoxyethanol, 124 grams (0.6 equivalent) of heptyl phenol, 848 grams of mineral oil and 190 grams of water there was added at 70° C., 306 grams (4.0 equivalents) of barium oxide. This mixture was heated at reflux temperature for an hour at 150° C. while bubbling carbon dioxide beneath the surface for three hours. The carbonated mixture was filtered through Hyflo to yield a liquid product having the following analyses:

Percent sulfate ash _____ 23.8
Neut. No _____ 9.7 (basic)
Metal ratio _____ 6.3

*Example 7*

A mixture of 423 grams (1.0 equivalent) of sperm oil, 124 grams (0.6 equivalent) of diisobutyl phenol, 520 grams of mineral oil and 146 grams of water was prepared, heated to 70° C. and then treated with 308 grams (4.0 equivalents) of barium oxide. This mixture was refluxed for an hour then dried by heating to 150° C., and carbonated by treatment with carbon dioxide at this temperature until it was slightly acidic. Filtration of this material yielded a clear light brown, non-viscous liquid having the following analyses:

Percent sulfate ash _____ 31.2
Neut. No. _____ 0.4 (acidic)
Metal ratio _____ 6.3

Example 8

A mixture of 1269 grams (3.0 equivalents) of sperm oil, 522 grams (1.8 equivalents) of a heptyl phenol-formaldehyde condensation product, 2169 grams of mineral oil, 540 grams of water was treated at 70° C. with 1134 grams (14.8 equivalents) of barium oxide. This mixture was stirred at reflux temperature for one hour then at 150° C., while carbon dioxide was bubbled beneath the surface. Filtration yielded a clear liquid having the following analyses:

Percent sulfate ash _____ 32.7
Neut. No. _____ 1.9 (basic)
Metal ratio _____ 8.2

Example 9

To a mixture of 915 grams (2.2 equivalents) of a sulfurized sperm oil, 273 grams (1.3 equivalents) of diisobutyl phenol, 1715 grams of mineral oil, and 396 grams of water there was added at 70° C. 833 grams (10.8 equivalents) of barium oxide. This mixture was heated at reflux temperature for an hour and then at 150° C. at which temperature carbon dioxide was bubbled through the mixture until it was substantially neutral. The mixture was filtered through Hyflo to yield a liquid having the following analyses:

Percent sulfate ash _____ 28.7
Neut. No. _____ 2.9 (basic)
Metal ratio _____ 7.0

Example 10

To a mixture of 174 grams (1.0 equivalent) of N-octadecyl propylene diamine, 124 grams (0.6 equivalent) of diisobutyl phenol, 766 grams of mineral oil, 146 grams of water there was added 306 grams (4.0 equivalents) of barium oxide and the whole was refluxed for an hour. Water was removed by raising the temperature to 150° C. whereupon carbon dioxide was bubbled through the mixture at this temperature until it was substantially neutral. The mixture was filtered through Hyflo to yield a clear oil-soluble liquid having the following analyses:

Percent sulfate ash _____ 28.9
Neut. No. _____ 2.5 (basic)
Metal ratio _____ 5.8

Example 11

To a mixture of 516 grams (2.0 equivalents) of an N-octadecyl propylene diamine-ethylene oxide condensation product, 346 grams (1.2 equivalents) of a heptyl phenol-formaldehyde condensation product, 1776 grams of mineral oil and 360 grams of water there was added 756 grams (9.9 equivalents) of barium oxide. After refluxing this mixture for one hour the temperature was raised to 150° C. and carbon dioxide was bubbled through the mixture until it was substantially neutral. Filtration through Hyflo yielded a liquid product having the following analyses:

Percent sulfate ash _____ 29.6
Neut. No. _____ 0.8 (basic)
Metal ratio _____ 7.4

The compositions which may be prepared by the process of this invention are readily adaptable for use as stabilizers in plastic formulations. Such compositions provide an alkaline reserve which appears to be effective in the inhibition of decomposition of the plastic material. This effectiveness is observable over a long period of time and under conditions of elevated temperature.

The thermal stability of the plastic compositions which contain the compositions described herein is shown by storage tests at elevated temperatures. Various products prepared as in the above examples were tested by milling them into a plastic composition containing 100 parts of a copolymer of 95 parts of vinyl chloride and 5 parts of vinyl acetate, 42 parts of dioctyl phthalate, and 0.4 part of cadmium naphthenate for 10 minutes at 150–160° C. In every case the result was a colorless flexible sheet. Subsequent storage of these sheets in an oven at 190° C. and a determination of the time required for each particular sheet to develop a specified degree of color provides a convenient means of ascertaining the thermal stability imparted to the plastic sheet by the particular stabilizing agent.

The following table demonstrates clearly the stabilizing action of these agents:

| Stabilizer | Percent by wt. (based on polymer) | Time (at 190° C.) req'd to produce color rating of 70 minutes |
|---|---|---|
| 1. Control | | 15 |
| 2. Product of Example 2 | 0.7 | 75 |
| 3. Product of Example 5 | 1.3 | 105 |
| 4. Product of Example 8 | 1.2 | 105 |
| 5. Product prepared as in Example 5 except that lard oil was substituted for sperm oil | 1.48 | 105 |

The milled plastic sheets are withdrawn from the oven at 15 minute intervals for purposes of inspection. Each such inspection involves rating the individual sheets according to a color scale ranging from 100 for a completely colorless sheet to 0 for a black sheet. A rating of 70 denotes a relatively light yellow color and a rating of 30 denotes a rather dark amber color. The rating of 70 was selected arbitrarily as that point in the development of color at which the test for that particular sample should be halted, and the time required to reach this point is taken as a measure of the thermal stability of the plastic sheet.

It will be noted from an inspection of the above test data that a plastic sheet containing no stabilizer of the type described herein develops a color rating of 70 within 15 minutes whereas each of the samples tested which contained a small amount of a product of the type described herein showed a much greater degree of thermal stability.

Although the above test data shows the value of only a few of the products of this invention a similar stabilizing action has been noted for many others of this type of product.

The stable plastic compositions of this invention contain a minor proportion of a product prepared by the process described and illustrated earlier. Very small amounts of such a product have been observed to be effective in enhancing the stability, particularly the thermal stability, of a polymeric composition. A particularly preferred range of concentration of the stabilizing agent of this invention is from about 0.1 to about 5.0 percent by weight based on the weight of the polymer in the stable composition. Thus for every 100 parts of a polymer it has been found that a concentration of the product of the process of this invention of more than 0.1 part is sufficient to stabilize such a polymer for most commercial applications, and ordinarily a concentration of more than 5.0 parts contributes no further stability to the composition.

Although the class of products available from the process described herein embraces a relatively large number of different compositions not all of these compositions are equally effective in their stabilizing action for polymeric materials. Some are more effective than others; the products prepared by the process in which component (b) is a neutral compound are generally more satisfactory than those prepared by a process in which this reactant is basic. Such neutral reactants include principally esters and alcohols. A particularly preferred reactant (b) is sperm oil, and other such esters likewise are to be preferred over other types of non-tautomeric organic polar compounds.

The compositions which result from the process of this invention are useful as stabilizers not only for polymers of vinyl chloride including copolymers thereof, but also as effective stabilizers of other polyolefins. Thus they may be used as stabilizers for polyethylene, polyisobutylene, polystyrene, polyvinyl chloride, polyvinylidene chloride, copolymers of vinyl chloride with vinyl acetate, ethylene, diethyl fumarate, dibutyl maleate, vinylidene chloride and the like, copolymers of isobutylene with isoprene, butadiene, styrene and the like, copolymers of vinylidene chloride with diethyl maleate, methyl acrylate, acrylamide vinyl acetate and the like.

The stabilizing action of these compositions is enhanced by the use also of cadmium salts of carboxylic acids. Examples of such cadmium salts include principally cadmium naphthenate, cadmium laurate, cadmium oleate, etc.

Other modes of applying the principle of the invention may be employed, change being made as regards the details described, provided the features stated in any of the following claims or the equivalent of such be employed.

I therefore particularly point out and distinctly claim as my invention:

1. A thermally stable composition containing a vinyl chloride polymer and a minor proportion of a product prepared by the process which comprises preparing a mixture of (a) an alkylated monohydroxy aromatic compound,
(b) an oil-soluble, metal-free, non-tautomeric organic polar compound having at least 12 aliphatic carbon atoms and selected from the class consisting of sulfoxides, alcohols, esters and amines, present in an amount greater than that of (a) on a weight basis, and
(c) at least two equivalents of a basic barium compound per equivalent of (a)

and heating said mixture to drive off substantially all free water which may be present and then treating said water-free mixture with an acidic gas having an ionization constant greater than that of (a) until the titratable basicity of the mixture has been substantially reduced.

2. A thermally stable composition containing a vinyl chloride polymer and from 0.1 to about 5.0 percent of a product prepared by the process which comprises preparing a mixture of (a) an alkylated monohydroxy aromatic compound,
(b) an oil-soluble, metal-free, non-tautomeric organic polar compound having at least 12 aliphatic carbon atoms and selected from the class consisting of sulfoxides, alcohols, esters and amines, present in an amount greater than that of (a) on a weight basis, and
(c) at least two equivalents of a basic barium compound per equivalent of (a)

and heating said mixture to drive off substantially all free water which may be present and then treating said water free mixture with an acidic gas having an ionization constant greater than that of (a) until the titratable basicity of the mixture has been substantially reduced.

3. The composition of claim 2 characterized further in that reactant (b) is an ester.

4. The composition of claim 2 characterized further in that reactant (b) is sperm oil.

5. The composition of claim 2 characterized further in that the acidic gas is carbon dioxide.

6. The composition of claim 2 characterized further in that the vinyl chloride polymer is polyvinyl chloride.

7. The composition of claim 2 characterized further in that the vinyl chloride polymer is a copolymer.

8. The composition of claim 2 characterized further in that the vinyl chloride polymer is a copolymer of vinyl chloride and vinyl acetate.

9. The composition of claim 2 characterized further in that it contains a minor proportion of a cadmium carboxylate.

References Cited in the file of this patent

UNITED STATES PATENTS

| | | |
|---|---|---|
| 2,616,924 | Asseff et al. | Nov. 4, 1952 |
| 2,616,925 | Asseff et al. | Nov. 4, 1952 |
| 2,671,064 | Cowell et al. | Mar. 2, 1954 |
| 2,695,910 | Asseff et al. | Nov. 30, 1954 |